United States Patent [19]

Masciarella et al.

[11] Patent Number: 5,023,998
[45] Date of Patent: Jun. 18, 1991

[54] FILAMENT HOLDER FOR A ROTATING FILAMENT VEGETATION CUTTER

[75] Inventors: Andrew M. Masciarella, Pompano Beach; George R. Whistler, Fort Meyers, both of Fla.

[73] Assignee: Advanced Products International, Inc., Pompano Beach, Fla.

[21] Appl. No.: 335,055

[22] Filed: Apr. 7, 1989

[51] Int. Cl.$^5$ .............................................. B26B 7/00
[52] U.S. Cl. ........................................ 30/276; 56/127
[58] Field of Search .................... 30/276; 56/12.7, 295

[56] References Cited

U.S. PATENT DOCUMENTS 4,054,992 10/1977 Ballas et al. ............................ 30/276
4,819,416 4/1987 Jones ...................................... 30/276

Primary Examiner—Douglas D. Watts
Assistant Examiner—Willmon Fridie, Jr.
Attorney, Agent, or Firm—Harry W. Barron

[57] ABSTRACT

A holder for a monofilament line used in a vegetation cutter, such as a grass trimmer or lawnmower, is divided into four quadrants and has a series of clips between each quadrant through which the monofilament line is woven for being held on the holder. The periphery of each quadrant is an arc slightly off center from the radial center of the holder, thereby creating a protrusion on the direction of rotation side of the clip area. This protrusion maintains hard objects, such as stones, away from the holder periphery on the other side of the clip area, thereby preventing the hard object from shearing off the monofilament line. In order to reduce the weight of the holder, recesses are formed on both sides thereof and the ground facing side recesses are angled to avoid the entrapment of grass in the holder. When the holder is used with an impeller type hovering lawnmower, the diameter thereof is made substantially the same as the diameter of the impeller to act as a shield for the impeller against abrasion.

25 Claims, 2 Drawing Sheets

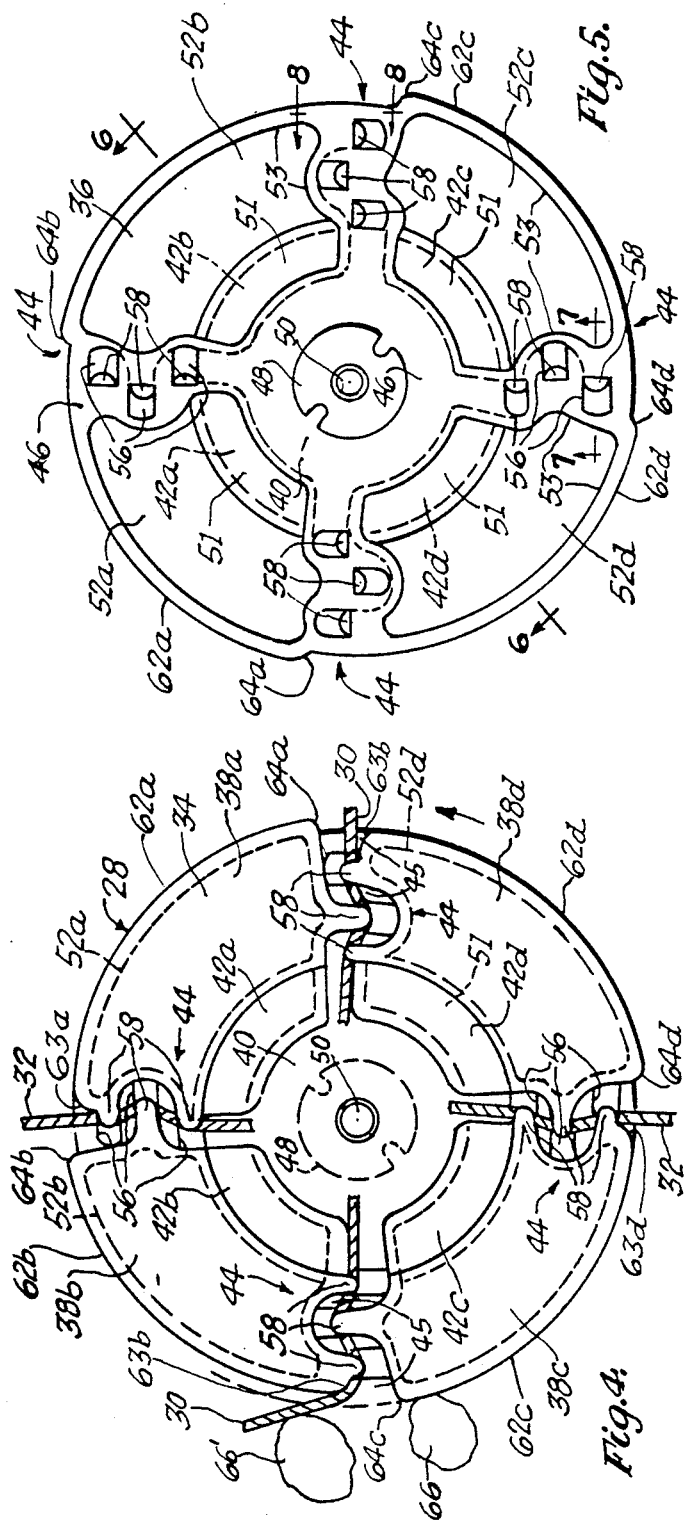

FILAMENT HOLDER FOR A ROTATING FILAMENT VEGETATION CUTTER

This invention relates to a rotating monofilament vegetation cutter, and more particularly, to a filament holder for such a cutter which may be used in a hovering type lawnmower.

Vegetation cutters which utilize a monofilament plastic line are well known. Typically these cutters in the past have been used in devices known as grass trimmers for cutting areas around permanent objects, such as trees, fences, houses and the like, which are not easily reached with a conventional lawnmower. Examples of such monofilament vegetation cutters are found in U.S. Pat. No. 4,190,954 in the name of Walto, entitled "Cutting Heads"; U.S. Pat. No. 3,708,967 in the name of Geist et al, entitled "Rotary Cutting Assembly"; U.S. Pat. No. 3,831,278 in the name of Voglesonger, entitled "Grass Trimmer"; U.S. Pat. No. 4,035,915 in the name of Pittinger, entitled "Filament Wound Perforate Plate System"; U.S. Pat. No. 4,043,037 in the name of Okamoto et al, entitled "Cord Type Mowing Tool"; U.S. Pat. No. 4,054,992 in the name of Ballas, entitled "Rotary Cutting Assembly"; U.S. Pat. No. 4,644,655 in the name of Bottamiller et al, entitled "Cutting Head For Lawn Trimmer"; U.S. Pat. No. 4,685,279 in the name of Gullett, entitled "Weed Trimmer"; and U.S. Pat. No. 4,756,146 in the name of Rouse, entitled "String Trimmer Head And Method".

One of the main advantages of the monofilament vegetation cutter is the safety it provides, in that the rotating monofilament strands can easily cut grass and weeds, yet will not severely cut a person if contacted by the operator, or another person in the vicinity. For example, the utilization of a monofilament cutting mechanism within a conventional rotary lawnmower is safer for the operator when compared to a conventional steel blade cutting mechanism. In addition, monofilament cutting mechanisms will not throw stones, or other objects, from beneath the mower, which thrown objects become fast moving projectiles that can injure someone in the vicinity of the mower. However, in the lawnmower application, the safety provided by using monofilament cutting mechanisms is offset by the short life of the monofilament line, relative to the much longer lasting metal lawnmower blades, which typically need only be maintained once or twice a year.

Conventional rotary lawnmowers, of the type using four wheels to support and transport the motor and cutting mechanism, have limited use in certain applications, particularly over an area which is not relatively level. Such areas include slanted banks, undulating surfaces, and the like, which are common, for example, on a golf course. Moving a conventional wheeled lawnmower over such areas is difficult and many times results in unsatisfactory cuts of the grass.

Because of the inherent problems with conventional rotary blade wheeled lawnmowers, golf course groundskeepers have, for many years, utilized what is known as a hover type lawnmower to cut certain difficult areas of the golf course. Examples of such hover lawnmowers are shown in U.S. Pat. Nos. 3,110,996 and Re. 28,098 in the name of Dahlman, entitled "Grass Cutting Machines"; U.S. Pat. No. 3,589,113 in the name of Svensson, entitled "Device For Steering An Air Cushioned Supported Lawnmower"; U.S. Pat. No. 3,756,336 in the name of Mattingley, entitled "Lawn Mower"; U.S. Pat. No. 3,921,372 in the name of Arnblock, entitled "Grass Cutting Device"; U.S. Pat. No. 4,245,455 in the name of Martin, entitled "Lawnmower"; U.S. Pat. No. 3,423,912 in the name of Heth, entitled "Ground Effect Lawnmower"; U.S. Pat. No. 3,877,206 in the name of Cody et al, entitled "Mowing Machine"; U.S. Pat. No. 3,838,558 in the name of Goodchild, entitled "Air Cushioned Lawn Mower And Grass Collector"; U.S. Pat. No. 4,204,388 in the name of Dawson, entitled "Air Cushioned Mower"; U.S. Pat. No. 4,245,456 in the name of Zipfel, entitled "Rotary Lawnmower With Grass Clearing Means" and U.S. Pat. No. 4,276,737 in the name of Henning, entitled "Vegetation Cutter".

The principle of operation of a hover type lawnmower is that an impeller, attached to an engine or a motor, forces air along the inside surface of a housing or deck. The air forced into the deck escapes from the edges around the bottom of the deck, thereby raising the deck slightly off the ground. Also, affixed to the shaft of the engine or motor is a conventional rotary lawnmower blade, which cuts the grass as the mower hovers slightly above the surface of the ground. As the mower hovers above the ground, an operator can guide it over the area to be cut with a minimum of effort.

One advantage to utilizing a hover type mower is that small depressions in the ground, in which the wheels of a conventional lawnmower descends, are essentially ignored by the hover mower as it floats above the ground surface. Thus, a more level cut of the grass can be obtained by using a hover mower, rather than the conventional rotary lawnmower traveling over the ground on wheels. Another advantage to a hover type lawnmower is the ease of use by the operator. The effort expended in moving a hovering mower over a given distance is much less than the effort expended in moving a conventional wheeled mower over the same distance.

The one major problem with hover type lawnmowers, which has limited their widespread use despite their several advantages, is that hovering lawnmowers are prone to injure the operator if not properly and carefully used. Because of the ease of use of a hover mower, operators tend to use the hover mower into tight areas, traditionally cut by a grass trimmer. In so doing, the operator may position himself, or the mower, in an awkward or unstable position, thereby increasing the likelihood of injury from the steel blade to himself as a result of kickback or falling. This danger is particularly great when the mowers are used on a steep bank, such as surrounding a golf course sandtrap or bunker, river, lake or canal bank and the like, where the mower can fall back onto the operator.

As previously mentioned, it is well known that the monofilament cutters of grass trimmers are far less dangerous to a person than a rotating steel blade. To overcome the inherent danger of personal injury due to improper use of the hover mower, one could replace the steel lawnmower blade with a monofilament cutter. Such has been suggested for a conventional wheeled lawnmower in U.S. Pat. No. 4,726,176 in the name of McGrew entitled "Rotary Mower Cutter Means". However, the rather simple solution suggested by McGrew with respect to a wheeled mower requires considerable refinement to be practical and useful with a hover type mower.

One problem which still must be overcome in order to utilize a monofilament line cutting mechanism with a hover type lawnmower, as well as to improve the usefulness of the conventional grass trimmer monofilament cutters, is a solution to the problem of the breakage of the monofilament line extending from the line holder. One common cause for monofilament line breakage is the line contacting a hard object, such as a stone, where the object is positioned against the line holder itself. In this circumstance, the hard object simply shears the monofilament line from the holder, due to the lack of any space between the object and the holder. If the object were not positioned against the monofilament line holder, the mere fact that the line hits the object typically would not break the line. It is only when the object is against, of very close to, the rotating line holder that the line is sheared off.

Shearing of the monofilament line has not been a major problem with lawn trimmer apparatus, because the operator can typically see a hard object as he is using the device and can move the trimmer away from direct contact with the object. However, with a hover mower, by the time the line comes in contact with the hard object, such as a stone, the stone is beneath the deck and out of the view of the operator. Even if the operator knew a stone was in the path, he would loose track of the stone as it became hidden beneath the moving hover mower deck, thereby permitting the stone to shear the monofilament line, if it contacted the line holder.

Another common problem with the hover type lawnmowers is the impeller used to force the air inside the deck is typically positioned within the enclosed deck and draws the air from outside and above the deck before forcing the air along the inner surface of the deck to raise the deck above the ground. A typical blade cutting mechanism in a hover mower tends to create a considerable amount of flying debris, such as sand and pebbles, within the interior of the deck due to the tremendous air flow. This debris can damage the impeller mechanism, unless some protection is provided to protect the impeller. Thus, the choice of the prior art was either the added expense of additional structure required to protect the impeller or otherwise allowing the unprotected impeller to have a short useful life.

In accordance with one aspect of this invention, there is provided a filament holder for a vegetation cutter of a type coupled to rotating means for rotating the holder, and the filament extending therefrom, at a rotational speed sufficient to permit said rotating filament to cut the vegetation. The holder comprises a disk shape member having means for holding one portion of the filament while another portion of the filament extends from the member. In addition, the member has a protrusion along the periphery thereof adjacent to the holding means.

One preferred embodiment of the subject invention is hereafter shown, with specific reference being made to the following Figures, in which:

FIG. 4 is a plan view of the bottom of the filament holder of the subject invention;

FIG. 5 is a plan view of the top of the filament holder of the subject invention;

FIG. 6 is a cross-sectional view across lines 6—6 of FIG. 5;

FIG. 7 is a cross-sectional view taken across lines 7—7 of FIG. 5; and

FIG. 8 is a cross-sectional view taken across lines 8—8 of FIG. 5.

Figure 1:
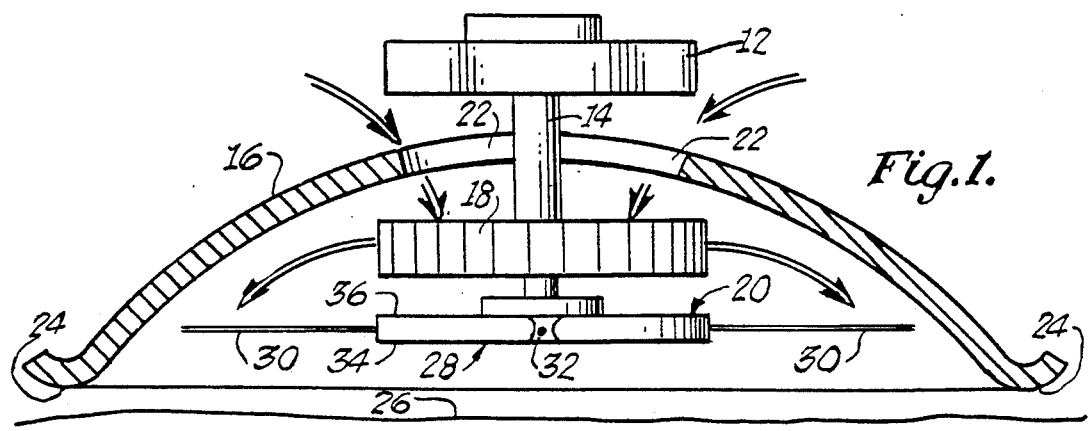
FIG. 1 shows a hover lawnmower having the filament holder of the subject invention, together with the filament extending therefrom, as the cutting mechanism.

Referring now to FIG. 1, a hover lawnmower 10 is shown and includes an engine 12 having a rotating shaft 14 which is attached above a housing or deck 16, such that shaft 14 extends into deck 16. Alternately, an electric motor may be utilized in place of engine 12. An impeller 18 is connected on shaft 14 and rotates as shaft 14 rotates. In addition, a cutter mechanism 20 is attached to the end of shaft 14 below impeller 18. Openings 22 in the top of deck 16 permit air to be drawn into impeller 18 and then directed along the interior sides of deck 16, as impeller 18 rotates. The air is then forced out the bottom 24 of deck 16 as impeller 18 forces more air into the interior of deck 16. The air flow is shown generally by the arrows in FIG. 1. As the air is forced out of bottom 24, it causes deck 16 to raise above the ground 26 by an amount sufficient to permit the air to escape out of bottom 24. This amount is also sufficient to permit hover lawnmower 10 to be moved over the ground 26 by an operator controlling handles (not shown) affixed to deck 16 with a minimum of effort.

A cutter mechanism 20 includes a monofilament line holder 28 and two monofilament lines 30 and 32 extending diagonally through and held by holder 28. The two monofilament lines 30 and 32 may be either round, as is conventionally the case, or they may be triangular or multi-sided, so as to provide a cutting edge. Holder 28 is generally a disk shaped object having clips or grooves formed therein for holding monofilament lines 30 and 32, in a manner which will be described in more detail hereafter. Such clips have been used in the past for holding monofilament lines, as indicated in the aforementioned U.S. Pat. No. 4,190,954 to Walto. Holder 28 is sized to have a diameter substantially the same as the diameter of impeller 18 and thus acts as a protecting guard against the abrasion of the thin blades of impeller 18 by sand, dirt, twigs and other debris lifted up from ground 26. Without the shielding effect of holder 28, either impeller 18 would be damaged by the debris, or an additional shielding mechanism would have to be provided.

Figure 2:
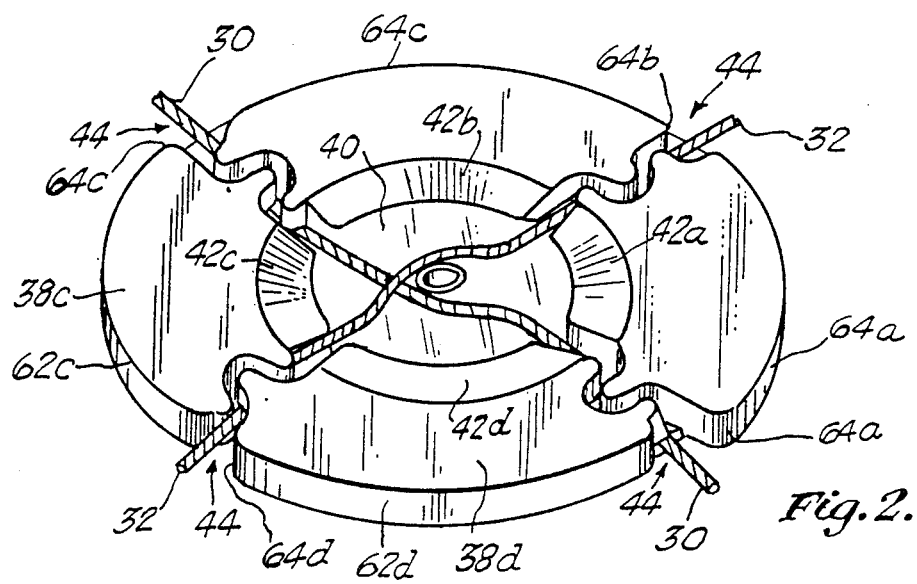
FIG. 2 is an isometric view of the bottom of the filament holder of the subject invention.
Figure 3:
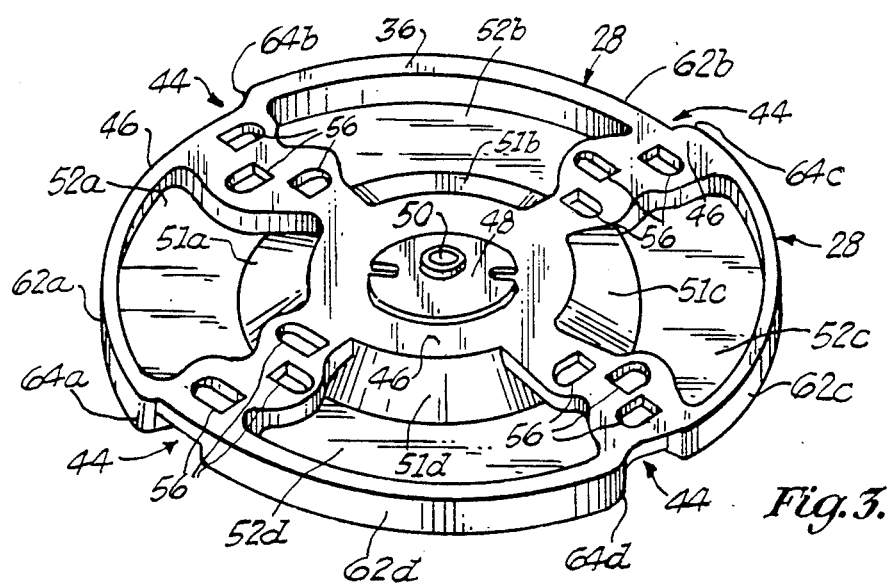
FIG. 3 is an isometric view of the top of the filament holder of the subject invention.

Referring now to FIGS. 2 through 6, holder 28 will now be described in detail. More specifically, FIGS. 2 and 4 show the bottom 34 of holder 28 and FIGS. 3 and 5 show the top 36 of holder 28 and FIG. 6 showing both top 36 and bottom 34 in cross section. As is used herein, the top 36 of holder 28 is that side of holder 28 closest to impeller 18 and the bottom 34 of holder 28 is that side of holder 28 closest to the ground 26. Also shown in FIGS. 2 and 4 is the positioning of two monofilament lines 30 and 32 held by holder 28 to permit both ends of each line 30 and 32 to exit from holder 28. Altenatively, four individual monofilament lines could be used, or the lines could exit from adjacent sections of holder 28, rather than opposite diagonal sections. In addition, only a single line or more than four extending lines could also be used.

Referring specifically now to bottom 34 of holder 28, which is seen in FIGS. 2 and 4. Bottom 34 has a generally flat outer ring broken into four bottom quadrant surfaces 38a through 38d, which surround a recessed central surface 40. Four slanted surfaces 42a through 42d connect recessed central surface 40 with the respective four bottom quadrant surfaces 38a through 38d. The angle of slanted surface 42 should be relatively small, for example between 20 and 25 degrees, in order to prevent cut grass from being trapped within the area of recessed central surface 40, thereby affecting the balance of the holder 28.

Between adjacent pairs of the bottom quadrant surfaces 38a through 38d is a filament attachment area 44 through which filaments 30 and 32 extend and are held in place. Generally, the filaments 30 and 32 extend along a floor 45 on the same plane as recess surface 40. Three clips 58 above and separated from floor 45 are also provided in each filament attachment area 44 and filaments 30 and 32 are held between the clips 58 and floor 45. The details of filament attachment area 44 will be described hereafter in more detail with reference to FIGS. 7 and 8.

Referring now to the top 36 of holder 28, which is best seen in FIGS. 3 and 5. Top 36 includes a main surface 46 having a connection extent 48 upward therefrom at the radial center. Extent 48 includes a hole 50 at the radial center of holder 28, through which shaft 14 is affixed and is designed for use with each specific mower 10. In addition, top 36 includes four recessed areas 52a through 52d, which are positioned generally opposite to the bottom quadrant surfaces 38a through 38d. The purpose of recessed areas 52a through 52d, as well as recessed central surface 40 shown in FIGS. 2 and 4, is to reduce the weight of holder 28, yet at the same time provides sufficient thickness and structural stability to permit holder 28 to maintain filament lines 30 and 32 between floor 45 and clips 58, as will be hereafter described in more detail.

A slanted surface 51 is also used to connect the inner radial side of each of the recesses 52a through 52d with the main surface 46. On the outer radial side of recesses 52a through 52d, as well as the sides of recesses 52a through 52d adjacent to attachment area 44, an essentially vertical wall surface 53 is utilized to connect the bottom of recess 52a with the upper main surface 46.

Referring additionally to FIGS. 7 and 8, filament attachment area 44 includes three openings 56 on the top 36 of holder 28 and three clips 58 formed on the bottom 34 of holder 28. Clips 58 may be extensions from the wall separating clip attachment areas 44 with recesses 52a through 52d. Clips 58 are positioned to be aligned with the openings 56 and, in fact, the openings 56 are provided for the sole purpose of forming clips 58 during the die casting or injection molding fabrication process. Between floor 45 and the bottom of clips 58 is a space 60 into which filaments 30 and 32 may be placed. Space 60 is designed to be slightly larger than filaments 30 and 32 so that filaments 30 and 32 easily fit therein. However, the back edge 61 of space 60 can be generally on the same straight line for each of the three clips 58 in each attachment area 44. With this construction, the monofilament lines 30 or 32 must be bent to fit against and beneath each of the clips in space 60. In other words, the monofilament lines 30 and 32 are woven between the clips 58. It is this weaving or bending which maintains the monofilament lines 30 and 32 firmly in place on holder 28.

One major problem in using any monofilament line vegetation cutter is that the line can become cut-off against the line holder when a hard object 66, such as a stone, tree branch or the like, contacts the outer periphery 62 of holder 24. As holder 24 rotates, the hard object 66 shears the extending filament 30 or 32 at the point it exits holder 28.

Applicants have overcome this problem by making the outer periphery 62a through 62d, bordering each of the four quadrant surfaces 38a through 38d, a slightly off centered arc relative to the radial center at the center of hole 50. By doing this, protrusions 64a through 64d are formed at the end of each quadrant opposite to the direction of rotation of holder 28. Thus, as holder 28 spins in the direction shown by the arrows adjacent to FIGS. 4 and 5, object 66 can only contact the tip of the protrusions 64a through 64d. In other words, object 66 is maintained somewhat removed from the periphery 62a through 62d on the direction of rotation side of attachment area 44, as indicated by the position of object 66', relative to rotating holder 28. By properly maintaining the amount of the protrusions 64a through 64d equal to at least the thickness of monofilament lines 30 and 32, (as indicated by the dashed lines in FIG. 4) stone 66, when in the 66' position, would merely bend monofilament 30 against holder 28, rather than shearing it off. In making the protrusions 64a through 64d, care must be taken to maintain the overall weight balance of holder 28, so that no vibrations are caused due to using an unbalanced holder 28 in a rotating machine.

While the above description has been explained with respect to a hover type lawnmower, holder 28 is equally useful with any type of rotating monofilament vegetation cutter, such as the conventional grass trimmers, sold under various trademarks, such as Weed Eater, or a conventional rotary wheeled lawnmower.

What is claimed is:

1. A filament holder for a vegetation cutter of a type coupled to rotating means for rotating said holder and at least one filament extending therefrom at a rotational speed sufficient to permit said rotating filament to cut said vegetation, said holder comprising:
a disk shaped member having a center and further having means for holding one portion of a filament while at least one other portion of said filament extends from at least one opening in the periphery of said member, each opening having first and second peripheral edges extending by respective first and second differing distances from the center of said member, the distance from the periphery of said member to the center of said member not decreasing from said first peripheral edge to the next adjacent second peripheral edge along the periphery of said member.

2. The invention according to claim 1 wherein said second peripheral edge is on the direction of rotation side of said opening.

3. The invention according to claim 2 wherein said member has a continuous surface from said first peripheral edge to said next adjacent peripheral edge.

4. The invention according to claim 3 wherein the amount of said difference between said first and second peripheral edges is at least equal to the thickness of said filament.

5. The invention according to claim 2 wherein the amount of said difference between said first and second peripheral edges is at least equal to the thickness of said filament.

6. The invention according to claim 1 wherein said second peripheral edge is on the direction of rotation side of said opening and said second peripheral edge is on the opposite to direction of rotation side of said opening.

7. The invention according to claim 6 wherein said first distance is less than said second distance.

8. The invention according to claim 1 wherein said first distance is less than said second distance.

9. A filament holder for a vegetation cutter of a type coupled to rotating means for rotating said holder and the filament extending therefrom at a rotational speed sufficient to permit said rotating filament to cut said vegetation, said holder comprising:
a disk shaped member having means for holding one portion of said filament while another portion of said filament extends from said member, said member having a protrusion along the periphery thereof adjacent to said holding means, said disk shaped member including at least one cutout on the vegetation facing side thereof, said cutout having an outward directed slanting surface.

10. The invention according to claim 9 wherein said outward directed slanting surface is radial.

11. A filament holder for a vegetation cutter of a type coupled to rotating means for rotating said holder and the filament extending therefrom at a rotational speed sufficient to permit said rotating filament to cut said vegetation, said holder comprising:
a disk shaped member having means for holding one portion of said filament while another portion of said filament extends from said member, said member having a protrusion along the periphery thereof adjacent to said holding means, said holding means including a plurality of clips which maintain said filament between first and second planes, said member having an outward directed slanting surface from said first plane to said second plane.

12. The invention according to claim 11 wherein said outward directed slanting surface is radial.

13. The invention according to claim 12 wherein said protrusion is on the direction of rotation side of said holding means.

14. The invention according to claim 13 wherein said member has a continuous surface from said holding means to said periphery on the side adjacent to said holding means opposite to the direction of rotation of said member.

15. The invention according to claim 14 wherein the amount of said protrusion is at least equal to the thickness of said filament.

16. The invention according to claim 13 wherein the amount of said protrusion is at least equal to the thickness of said filament.

17. In a hover mower of the type having rotating means positioned above a hood and having a shaft extending into said hood, means for drawing air from above said hood and directing said air along the inner surface and out of the bottom of said hood to maintain said hood above the ground, the improvement of a filament cutter for affixation to said shaft comprising:
a disk shaped member having a periphery and a center, said center being affixed to said shaft; and
means, including a plurality of channels from interior of said member to said periphery of said member, formed in association with one of said channels for holding one portion of a filament while another portion of said filament extends through said one channel and away from said member, said channels each having two intersections with said periphery, the distance from said center of said member to each of said two intersections for each channel being different.

18. The invention according to claim 17 wherein said member has substantially the same dimensions as said means for drawing and directing air.

19. The invention according to claim 15 wherein said intersection having the longer distance from said center is in the direction of rotation of said member.

20. The invention according to claim 19 wherein the periphery of said member has a surface with a nondecreasing distance to said center from each intersection, opposite to the direction of rotation to the next adjacent intersection in a direction opposite to the direction of rotation.

21. The invention according to claim 20 wherein the difference between the distances to each intersection is equal to at least the thickness of said filament.

22. The invention according to claim 17 wherein said intersection having the longer distance from said center is in the direction of rotation of said member.

23. The invention according to claim 22 wherein the periphery of said member has a surface with a nondecreasing distance to said center from each intersection, opposite to the direction of rotation to the next adjacent intersection in a direction opposite to the direction of rotation.

24. The invention according to claim 23 wherein the difference between the distances to each intersection is equal to at least the thickness of said filament.

25. In a hover mower of the type having rotating means positioned above a hood and having a shaft extending into said hood, means for drawing air from above said hood and directing said air along the inner surface and out of the bottom of said hood to maintain said hood above the ground, the improvement of a filament cutter for affixation to said shaft comprising:
a disk shaped member having the center thereof affixed to said shaft, said disk shaped member including at least one cutout on the bottom facing side thereof, said cutout having an outward directed slanting surface;
means formed on said member for holding one portion of a filament while another portion of said filament extend from said member; and
a protrusion along the rotational periphery of said member adjacent to one side of said holding means.

* * * * *